(12) United States Patent
Zhu et al.

(10) Patent No.: US 10,218,609 B2
(45) Date of Patent: Feb. 26, 2019

(54) METHOD AND DEVICE FOR SYNCHRONIZING INTERFACE PARAMETER

(71) Applicant: ZTE CORPORATION, Shenzhen, Guangdong Province (CN)

(72) Inventors: Wei Zhu, Guangdong Province (CN); Chun Zhu, Guangdong Province (CN)

(73) Assignee: ZTE CORPORATION, Shenzhen (CN)

( * ) Notice: Subject to any disclaimer, the term of this patent is extended or adjusted under 35 U.S.C. 154(b) by 179 days.

(21) Appl. No.: 15/033,251

(22) PCT Filed: Jun. 17, 2014

(86) PCT No.: PCT/CN2014/080138
§ 371 (c)(1),
(2) Date: Apr. 29, 2016

(87) PCT Pub. No.: WO2015/062285
PCT Pub. Date: May 7, 2015

(65) Prior Publication Data
US 2016/0269281 A1    Sep. 15, 2016

(30) Foreign Application Priority Data
Oct. 29, 2013    (CN) .......................... 2013 1 0522567

(51) Int. Cl.
*H04L 12/28* (2006.01)
*H04L 12/723* (2013.01)
(Continued)

(52) U.S. Cl.
CPC .......... *H04L 45/50* (2013.01); *H04L 12/4633* (2013.01); *H04L 45/68* (2013.01); *H04L 49/3054* (2013.01)

(58) Field of Classification Search
CPC ..... H04L 12/4633; H04L 12/66; H04L 45/04; H04L 45/50; H04L 45/507; H04L 45/68; H04L 49/3054
(Continued)

(56) References Cited

U.S. PATENT DOCUMENTS

2006/0291445 A1    12/2006  Martina Luca et al.
2008/0253367 A1*   10/2008  Ould-Brahim .......... H04L 45/04
                                                     370/389
(Continued)

FOREIGN PATENT DOCUMENTS

CN    101529811 A    9/2009
CN    102347873 A    8/2012

OTHER PUBLICATIONS

International Search Report (Form PCT/ISA/210) for International Application No. PCT/CN2014/080138 dated Sep. 15, 2014.
(Continued)

*Primary Examiner* — Harun Chowdhury

(57) ABSTRACT

Provided are a method and device for synchronizing an interface parameter. According to the method, related information, sent by a remote Terminating Provider Edge (TPE) of a first Pseudo-Wire (PW) in a first segment of PW of a Switching Provider Edge (SPE), of the first PW is received or recorded, wherein the related information of the first PW carries an interface parameter of the remote TPE of the first PW, and the interface parameter is used for establishing a Label Switch Path (LSP); and the related information of the first PW is sent to a remote TPE of a second segment of PW of the SPE. By the solution, a problem caused by incapability of opposite equipment in timely perceiving updating of an interface parameter of local equipment is solved, and the opposite equipment can use a correct interface parameter value for negotiation and PW establishment.

9 Claims, 7 Drawing Sheets

(51) Int. Cl.
*H04L 12/46* (2006.01)
*H04L 12/935* (2013.01)
*H04L 12/721* (2013.01)

(58) Field of Classification Search
USPC .................. 370/389, 392, 401, 467; 709/230
See application file for complete search history.

(56) References Cited

U.S. PATENT DOCUMENTS

| | | | | |
|---|---|---|---|---|
| 2010/0023632 A1* | 1/2010 | Liu | ................... | H04L 12/4633 709/230 |
| 2013/0259057 A1* | 10/2013 | Dutta | ................... | H04L 45/68 370/401 |
| 2015/0281058 A1* | 10/2015 | Gao | ................... | H04L 45/68 370/401 |

OTHER PUBLICATIONS

European Search Report for Application No. 14858333.9; dated Jun. 19, 2017.

* cited by examiner

METHOD AND DEVICE FOR SYNCHRONIZING INTERFACE PARAMETER

TECHNICAL FIELD

The present disclosure relates to the field of communication, and in particular to a method and device for synchronizing an interface parameter.

BACKGROUND

Along with development of an Internet Protocol (IP) data network, the IP data network has become very high in expansibility, upgradability and compatible intercommunication capability. However, upgrading, expansion and intercommunication flexibility of a conventional communication network, such as a Frame Relay (FR) network and an Asynchronous Transfer Mode (ATM) network, is relatively poorer. Under limits of transmission manners and service types, a newly established network is relatively poorer in affinity, which brings inconvenience to intercommunication management. A Pseudo-Wire Emulation Edge-to-edge (PWE3) technology provides a service of transmitting layer-2 messages, such as an Ethernet message, an FR message and an ATM message, of a user on a Packet Switched Network (PSN) by deploying a Pseudo-Wire (PW) (also called a virtual link) between Provider Edges (PEs). Since the PWE3 technology can implement transmission of different services of a provider in the same network, an original access manner may be merged with an existing IP backbone network to reduce repeated network construction and reduce operation cost. In addition, the IP backbone network can be connected with diversified access networks to implement transformation and enhancement of the original data network. Therefore, these advantages of the PWE3 technology makes it applied more and more widely to various requirements and networking of the providers.

FIG. 1 is a diagram showing the reference model of a typical PWE network according to a related technology. As shown in FIG. 1, Customer Edge 1 (CE1) of a local area network 1 of a certain user accesses PE1 of a Multi-Protocol Label Switching (MPLS) backbone network of a provider through Attachment Circuit 1 (AC1); CE2 of a local area network 2 of this user accesses PE2 of the MPLS backbone network of the provider through AC2; and the provider deploys a PW for this service between PE1 and PE2. A PW is a pair of one-way Label Switch Paths (LSPs) in opposite directions. A message, sent on AC1, in local area network 1 of the user is encapsulated into a Protocol Data Unit (PDU) of the PW, and is transparently transmitted to opposite PE2 through the PW. When the message reaches PE2, PE2 locally processes and restores the message into a local form, and forwards the message to local area network 2 of the user through AC2. Message forwarding from CE2 to CE1 is similar to the process described above.

In a network environment, for various reasons, different network providers cannot establish Single-Segment Pseudo-Wires (SSPWs) between PW Terminating Provider Edges (TPEs) in respective areas, for example, for the sake of security, the providers cannot establish direct PW control channels between the TPEs in respective areas; or for the sake of expansibility, the providers adopt different PSN encapsulation technologies in respective areas; or in order to control traffic exchange among different networks, the providers adopt different PWE3 signalling protocols in respective areas. Therefore, use of Multi-Segment Pseudo-Wires (MSPWs) for implementing interconnection among the TPEs of different network providers is required. In addition, in a large-scale service provider network, a network edge may have multiple pieces of aggregation equipment, each piece of equipment may be a PE, and a bandwidth of a PW in the network may be definitely guaranteed, so that Traffic Engineering (TE) may be adopted as a PSN tunnel of the PW. Under such a condition, adoption of an SSPW architecture may increase some overhead of TE tunnel and further increase the number of PEs supporting these tunnels as well as the number of core network PEs, as a result, a service provider may divide the network into multiple PWE3 areas, and an MSPW architecture is adopted between every two PWE3 areas. In an access network and a metropolitan area network, a service provider may also adopt an MSPW architecture to improve maintainability and reduce operation cost.

There are three MSPW establishment mechanisms:
(1) Static configuration: each segment of PW is manually configured on PW Switching Provider Edges (SPEs);
(2) Path presetting: a PW path is preset, and each segment of PW is automatically spliced between the SPEs by virtue of an end-to-end signalling protocol; and
(3) Signalling-based dynamic path selection: a PW establishment path is dynamically determined by virtue of one or more dynamic routing protocols through the end-to-end signalling protocol, and each segment of PW is automatically spliced between the SPEs.

When the first mechanism is adopted for an MSPW establishment process, under a condition that each segment of PW has the same Forwarding Equivalence Class (FEC) type in an MSPW signalling process, an SPE cannot actively trigger a PWE3 signalling message to remote equipment, and the SPE can trigger the PWE3 signalling message to remote equipment of the next segment of PW only after at least receiving a PWE3 signalling message of remote equipment of a certain segment of PW. FIG. 2 is a diagram showing a reference model of a typical MSPW network according to the related technology. As shown in FIG. 2, links PW1 and PW2 which have the same PW FEC type are manually configured on an SPE, so as to establish an MSPW between TPE1 and TPE2. PW related information (including an interface parameter) is manually configured on TPE1 and TPE2, TPE1 sends a PWE3 signalling message to the SPE, the SPE resolves and stores related data (including the interface parameter) after receiving the PWE3 signalling message from TPE1, then the SPE sends a PWE3 signalling message containing the interface parameter of TPE1 to TPE2, TPE2 resolves and stores the related data (including the interface parameter) carried in the signalling message after receiving the PWE3 signalling message sent by the SPE, and performs negotiation with the locally configured parameter, and after successful negotiation, the PW is established and an LSP is formed. The process of sending a PWE3 signalling message from TPE2 to TPE1 is similar to the process described above.

Along with increase of a requirement of a user on network reliability, a provider usually needs to deploy a protection measure for a PW service to ensure that a standby PW can be rapidly found to take over the work done by the original PW when the original PW fails. Conventional PW service protection is based on a PSN tunnel level, that is, a redundancy protection technology, such as a Label Distribution Protocol (LDP)-based Fast ReRoute (FRR) technology or a ReSource Reservation Protocol-Traffic Engineering (RSVP-TE)-based FRR technology, is deployed for an outer-layer tunnel of a PW. However, this kind of protection is not enough for PPW-based end-to-end service protection. For example, the PSN-level-based redundancy protection measure is helpless to the conditions of a failure of a PW service access side, a failure of a TPE node, a failure of an SPE node and the like. Therefore, a PW service level-based redundancy protection mechanism is further proposed in the industry.

In order to protect the conditions of an AC failure, a TPE node failure, an SPE node failure, a PW failure and the like in an MSPW scenario, a CE dual-homing MSPW redundancy protection solution is adopted in the related technology. FIG. 3 is a diagram showing a scenario of dual-homing MSPW redundancy protection according to the related technology. As shown in FIG. 3, CE1 is dual-homed to TPE1 and TPE2 and CE2 is dual-homed to TPE3 and TPE4. PW11 links TPE1 to SPE1, PW21 and PW22 link TPE2 to SPE1 and SPE2 respectively, PW13 and PW14 link SPE1 to TPE3 and TPE4 respectively, and PW23 and PW24 link SPE2 to TPE3 and TPE4 respectively. Similarly, PW13 and PW23 link TPE3 to SPE1 and SPE2 respectively, PW14 and PW24 link TPE4 to SPE1 and SPE2 respectively, PW11 and PW21 link SPE1 to TPE1 and TPE2 respectively, and PW22 links SPE2 to TPE2. After PWE3 signalling is completed to form an LSP, available data forwarding paths formed from CE1 to CE2 are:

CE1-AC1-TPE1-PW11-SPE1-PW13-TPE3-AC3-CE2,
CE1-AC1-TPE1-PW11-SPE1-PW14-TPE4-AC4-CE2,
CE1-AC2-TPE2-PW21-SPE1-PW13-TPE3-AC3-CE2,
CE1-AC2-TPE2-PW21-SPE1-PW14-TPE4-AC4-CE2,
CE1-AC2-TPE2-PW22-SPE2-PW23-TPE3-AC3-CE2,
and
CE1-AC2-TPE2-PW22-SPE2-PW24-TPE4-AC4-CE2.

In a stable state that no AC fails, only one LSP is selected for forwarding traffic from CE1 to CE2, and it is assumed that the path selected for forwarding the traffic is: CE1-AC1-TPE1-PW11-SPE1-PW13-TPE3-AC3-CE2. In the traffic forwarding path, effective protection as well as local convergence can be provided for a single-point failure of each node except nodes CE1 and CE2. For example, if node SPE1 fails, then the traffic path is switched to CE1-AC2-TPE2-PW22-SPE2-PW23-TPE3-AC3-CE2. If PW13 fails, SPE1 switches the traffic to PW14, CE2 simultaneously switches the traffic to AC4, and the traffic forwarding path from CE1 to CE2 is switched to CE1-AC1-TPE1-PW11-SPE1-PW14-TPE4-AC4-CE2. Therefore, in such a scenario, a failure of a single TPE or SPE node or a failure of a single-segment Pseudo-Wire will not trigger switching of the whole forwarding path from CE1 to CE2 and will only trigger local switching to implement local convergence of the traffic forwarding path, which improves switching efficiency. Even if multiple TPEs and SPEs fail on the traffic forwarding path, global switching of the traffic forwarding path can still be implemented. For example, if TPE1, SPE1 and TPE3 all fail, the traffic forwarding path is switched to CE1-AC2-TPE2-PW22-SPE2-PW24-TPE4-AC4-CE2.

In a research process, the inventor finds that interface parameters of the access side of TPE1 and TPE2 should be configured to be the same under the same service because TPE1 and TPE2 are linked to the same CE through AC1 and AC2 respectively in the MSPW redundancy scenario shown in FIG. 3. However, the interface parameters of the access side of TPE1 and TPE2 are configured by the user, so that there may exist the condition of inconsistent user configurations, which will further cause the situation that remote interface parameters of master-standby SSPWs on the same side of the SPE are inconsistent and finally cause use of incorrect interface parameters on the LSP.

A Virtual Circuit Connectivity Verification (VCCV) parameter in a PW interface parameter will be selected as an example to describe the abovementioned defect below. FIG. 4a is a diagram showing the signalling interaction in a dual-homing MSPW redundancy protection scenario when local configuration of a VCCV parameter is modified according to the related technology. The signalling interaction flow shown in FIG. 4a includes the following steps.

Step 41: TPE1, TPE2, TPE3 and TPE4 locally configure consistent VCCV values, wherein CCTYPE is 0x01 and CVTYPE is 0x04.

Step 42: in a PWE3 signalling process, PW11, PW21, PW13 and PW14 successfully negotiate and form an LSP, wherein negotiated VCCV values thereof include CCTYPE 0x01 and CVTYPE 0x04.

Step 43: it is assumed that a traffic forwarding path from CE1 to CE2 is determined to be: CE1-AC1-TPE1-PW11-SPE1-PW13-TPE3-AC3-CE2, a user expects to modify the negotiated VCCV values of the forwarding LSP to be CCTYPE 0x01 and CVTYPE 0x08 to meet an application requirement, and the user deletes a local configuration of TPE1 and reconfigures the VCCV values to be CCTYPE 0x01 and CVTYPE 0x08.

Step 44: TPE1 triggers a PWE3 signalling withdraw message to SPE1 and locally withdraws a single-segment LSP of PW11, SPE1 receives the PWE3 signalling withdraw message of TPE1, withdraws a local single-segment LSP of PW11, and triggers local switching to switch traffic from PW11 to PW21, and CE1 simultaneously perceives a failure of PW11, and switches the traffic to AC2. By now, the traffic forwarding path is CE1-AC2-TPE2-PW21-SPE1-PW13-TPE3-AC3-CE2. However, the right side of SPE1 does not perceive switching of the traffic on a left side in the process.

Step 45: TPE1 performs local negotiation based on the new CVVC parameter values to form a single-segment LSP of PW11, wherein TPE1 performs "AND (&)" operation on the local VCCV values and remote VCCV values during negotiation, the new negotiated VCCV values of TPE1 will be CCTYPE 0x01 and CVTYPE 0x00, TPE1 simultaneously triggers a PWE3 signalling message to SPE1, and SPE1 locally forms a single-segment LSP of PW11 after receiving the PWE3 signalling message of TPE1.

Step 46: the user continues deleting a PW21 configuration locally at TPE2 and reconfigures the VCCV values to be CCTYPE 0x01 and CVTYPE 0x08. TPE2 triggers a PWE3 signalling withdraw message to SPE1 and locally withdraws a single-segment LSP of PW21, SPE1 receives the PWE3 signalling withdraw message of TPE2, withdraws a local single-segment LSP of PW21, and triggers local switching to switch traffic from PW21 to PW11, and CE1 simultaneously perceives a failure of PW21, and switches the traffic to AC1. By now, the traffic forwarding path is CE1-AC1-TPE1-PW11-SPE1-PW13-TPE3-AC3-CE2. However, the right side of SPE1 does not perceive switching of the traffic on the left side in the process.

Step 47: TPE2 performs local negotiation based on the new CVVC parameter values to form a single-segment LSP of PW11, wherein TPE2 performs "AND (&)" operation on the local VCCV values and remote VCCV values during negotiation, the new negotiated VCCV values of TPE2 will be CCTYPE 0x01 and CVTYPE 0x00, TPE2 simultaneously triggers a PWE3 signalling message to SPE1, and SPE1 locally forms a single-segment LSP of PW11 after receiving the PWE3 signalling message of TPE1.

Thus it can be seen that TPE3 and TPE4 on the right side of the SPE cannot perceive changes in the local parameters of TPE1 and TPE2 in the whole process. FIG. 4b is a diagram showing the signalling interaction in a dual-homing MSPW redundancy protection scenario when local configuration of a VCCV parameter is modified according to the related technology. As shown in FIG. 4b, a user similarly performs the same configuration operation on PW13 on TPE3 and PW14 on TPE4 respectively. Such a configuration process finally causes the phenomenon that the VCCV configuration values of PW11 on TPE1, PW21 on TPE2, PW13 on TPE3 and PW14 on TPE4 are CCTYPE 0x01 and CVTYPE 0x08, while the recorded remote VCCV values are always CCTYPE 0x01 and CVTYPE 0x04, which cause the phenomenon that negotiation results of the VCCV values are CCTYPE 0x01 and CVTYPE 0x00, as a result, the opposite equipment cannot use correct interface parameter values for negotiation and PW establishment.

For a problem caused by incapability of opposite equipment in timely perceiving updating of an interface parameter of local equipment, there is yet no effective solution.

SUMMARY

The embodiments of the present disclosure provide a method and device for synchronizing an interface parameter, so as to at least solve a problem caused by incapability of opposite equipment in timely perceiving updating of an interface parameter of local equipment.

According to a first aspect of the embodiments of the present disclosure, a method for synchronizing an interface parameter is provided, which may include that: related information, sent by a remote TPE of a first PW in a first segment of PW of an SPE, of the first PW is received or recorded, wherein the related information of the first PW may carry an interface parameter of the remote TPE of the first PW, and the interface parameter may be used for establishing an LSP; and the related information of the first PW is sent to a remote TPE of a second segment of PW of the SPE.

In an example embodiment, under a condition of withdrawal of a single segment of PW of the first PW, the method may further include that: related information, sent by a remote TPE of a second PW in the first segment of PW of the SPE, of the second PW is received and recorded, wherein the related information of the second PW may carry an interface parameter of the remote TPE of the second PW, and the interface parameter may be used for establishing an LSP; and a signalling withdraw message is sent to the remote TPE of the second segment of PW, wherein the signalling withdraw message may be used for indicating the remote TPE of the second segment of PW to remove an interface parameter received by the remote TPE of the second segment of PW.

In an example embodiment, before the step that the signalling withdraw message is sent to the remote TPE of the second segment of PW, the method may further include that: whether the interface parameter of the remote TPE of the first PW carried in the recorded related information is consistent with the interface parameter of the remote TPE of the second PW carried in the recorded related information is judged, wherein the signalling withdraw message is sent to the remote TPE of the second segment of PW when it is judged that the interface parameter of the remote TPE of the first PW is inconsistent with the interface parameter of the remote TPE of the second PW.

In an example embodiment, after the step that the signalling withdraw message is sent to the remote TPE of the second segment of PW, the method may further include that: the related information of the second PW is sent to the remote TPE of the second segment of PW.

In an example embodiment, before the LSP is established according to the related information of the first PW, the method may further include that: the first PW is determined according to a preset strategy.

In an example embodiment, the preset strategy may include one of: determining one PW in the first segment of PW as the first PW according to a preset configuration under a condition that unique identification information of PWs is not configured in a local configuration of the SPE; and determining the PW, of which related information is received first, in the PWs in the first segment of PW as the first PW under a condition that the unique identification information of the PWs has been configured in the local configuration of the SPE.

In an example embodiment, the related information may further carry at least one of following parameters of the corresponding PW: a next-hop address, a PW identifier (ID), a PW type and a Forwarding Equivalence Class (FEC) type.

According to another aspect of the embodiments of the present disclosure, a device for synchronizing an interface parameter is further provided, which may include: a first receiving component, configured to receive and record related information, sent by a remote TPE of a first PW in a first segment of PW of an SPE, of the first PW, wherein the related information of the first PW may carry an interface parameter of the remote TPE of the first PW, and the interface parameter may be used for establishing an LSP; and a first sending component, configured to send the related information of the first PW to a remote TPE of a second segment of PW of the SPE.

In an example embodiment, the device may further include: a second receiving component, configured to receive and record related information, sent by a remote TPE of a second PW in the first segment of PW of the SPE, of the second PW, wherein the related information of the second PW may carry an interface parameter of the remote TPE of the second PW, and the interface parameter may be used for establishing an LSP; and a second sending component, configured to send a signalling withdraw message to the remote TPE of the second segment of PW, wherein the signalling withdraw message may be used for indicating the remote TPE of the second segment of PW to remove an interface parameter received by the remote TPE of the second segment of PW.

In an example embodiment, the device may further include: a judgment component, configured to judge whether the interface parameter of the remote TPE of the first PW carried in the recorded related information is consistent with the interface parameter of the remote TPE of the second PW carried in the recorded related information, wherein the second sending component is configured to send the signalling withdraw message to the remote TPE of the second segment of PW under a condition that the judgment component judges that the interface parameter of the remote TPE of the first PW is inconsistent with the interface parameter of the remote TPE of the second PW.

In an example embodiment, the device may further include: a third sending component, configured to send the related information of the second PW to the remote TPE of the second segment of PW.

According to the embodiments of the present disclosure, the related information, sent by the remote TPE of the first PW in the first segment of PW of the SPE, of the first PW is received and recorded, wherein the related information of the first PW carries the interface parameter of the remote TPE of the first PW, and the interface parameter is used for establishing the LSP; and the related information of the first PW is sent to the remote TPE of the second segment of PW of the SPE. By virtue of the technical solution, a problem caused by incapability of opposite equipment in timely perceiving updating of an interface parameter of local equipment is solved, and the opposite equipment can use a correct interface parameter value for negotiation and PW establishment.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

It is important to note that embodiments in the present disclosure and characteristics in the embodiments may be combined when it is judged that the interface parameter of the remote TPE of the first PW is inconsistent with the interface parameter of the remote TPE of the second PW conflicts. The present disclosure will be described below with reference to the drawings and the embodiments in detail.

Steps shown in flowcharts of the drawings may be executed in a computer system, such as a set of computers, capable of executing instructions, and moreover, although logic sequences are shown in the flowcharts, the shown or described steps may be executed in sequences different from the sequences shown here under some circumstances. For example, Step S502 and Step S504 in the following embodiment may be executed in an unlimited sequence, or may also be executed at the same time.

Figure 1:
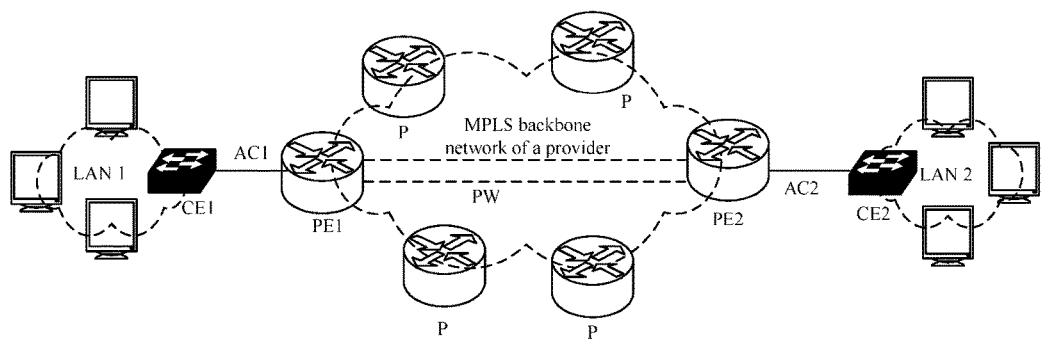
FIG. 1 is a diagram showing the reference model of a typical PWE network according to a related technology.
Figure 2:
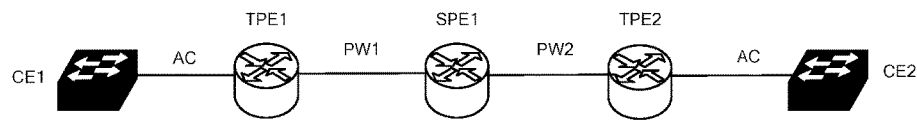
FIG. 2 is a diagram showing a reference model of a typical MSPW network according to the related technology.
Figure 3:
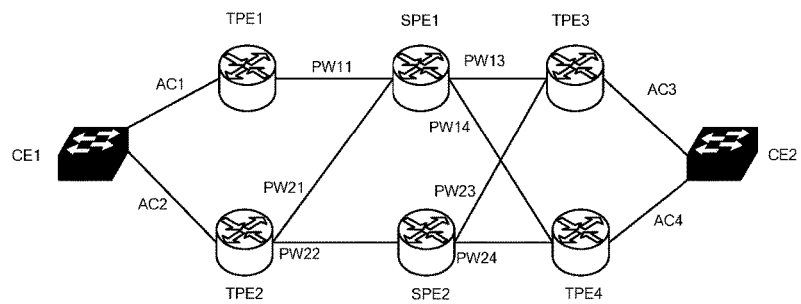
FIG. 3 is a diagram showing a scenario of dual-homing MSPW redundancy protection according to the related technology.
Figure 4A:
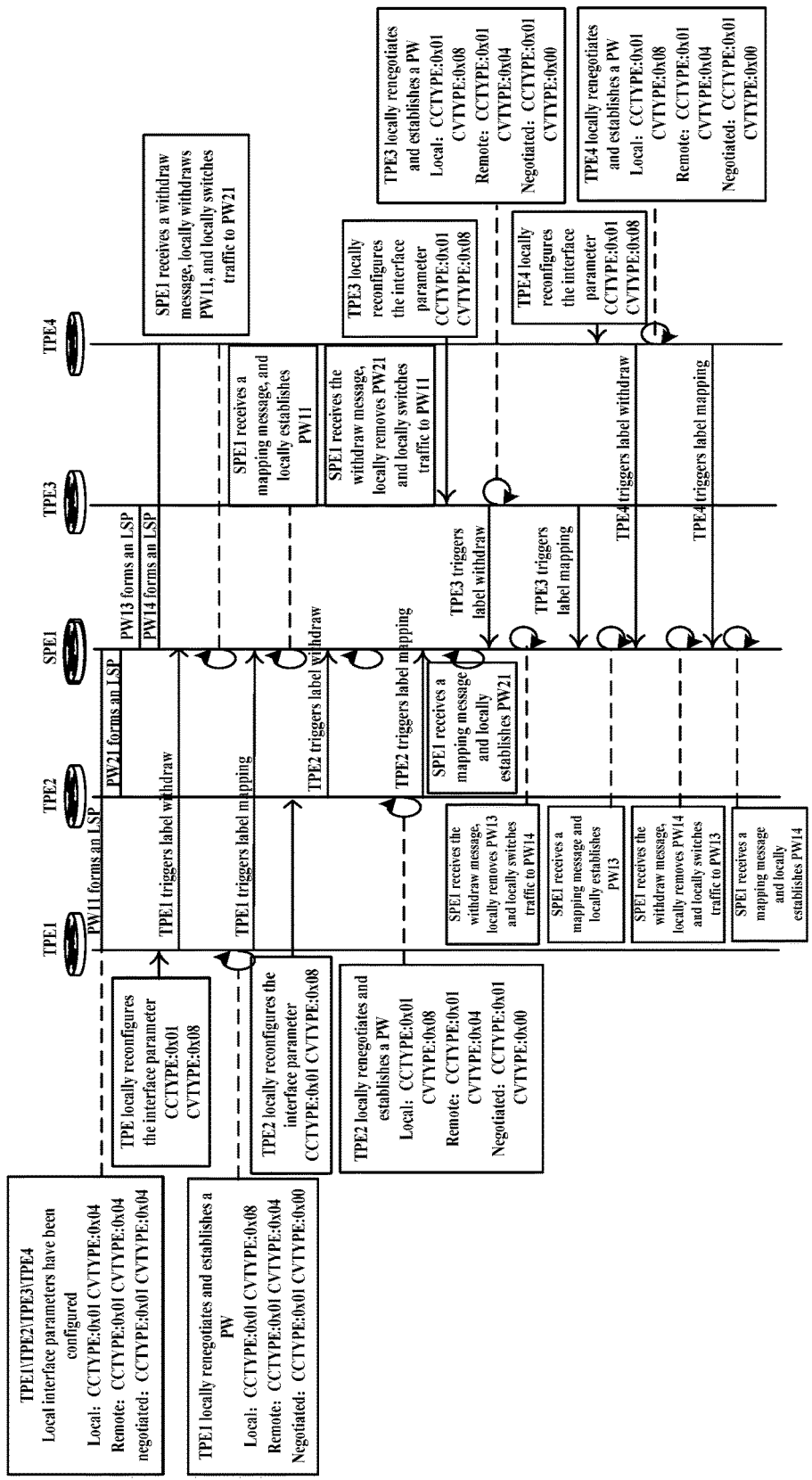
FIG. 4a is a diagram showing the signalling interaction in a dual-homing MSPW redundancy protection scenario when local configuration of a VCCV parameter is modified according to the related technology.
Figure 4B:
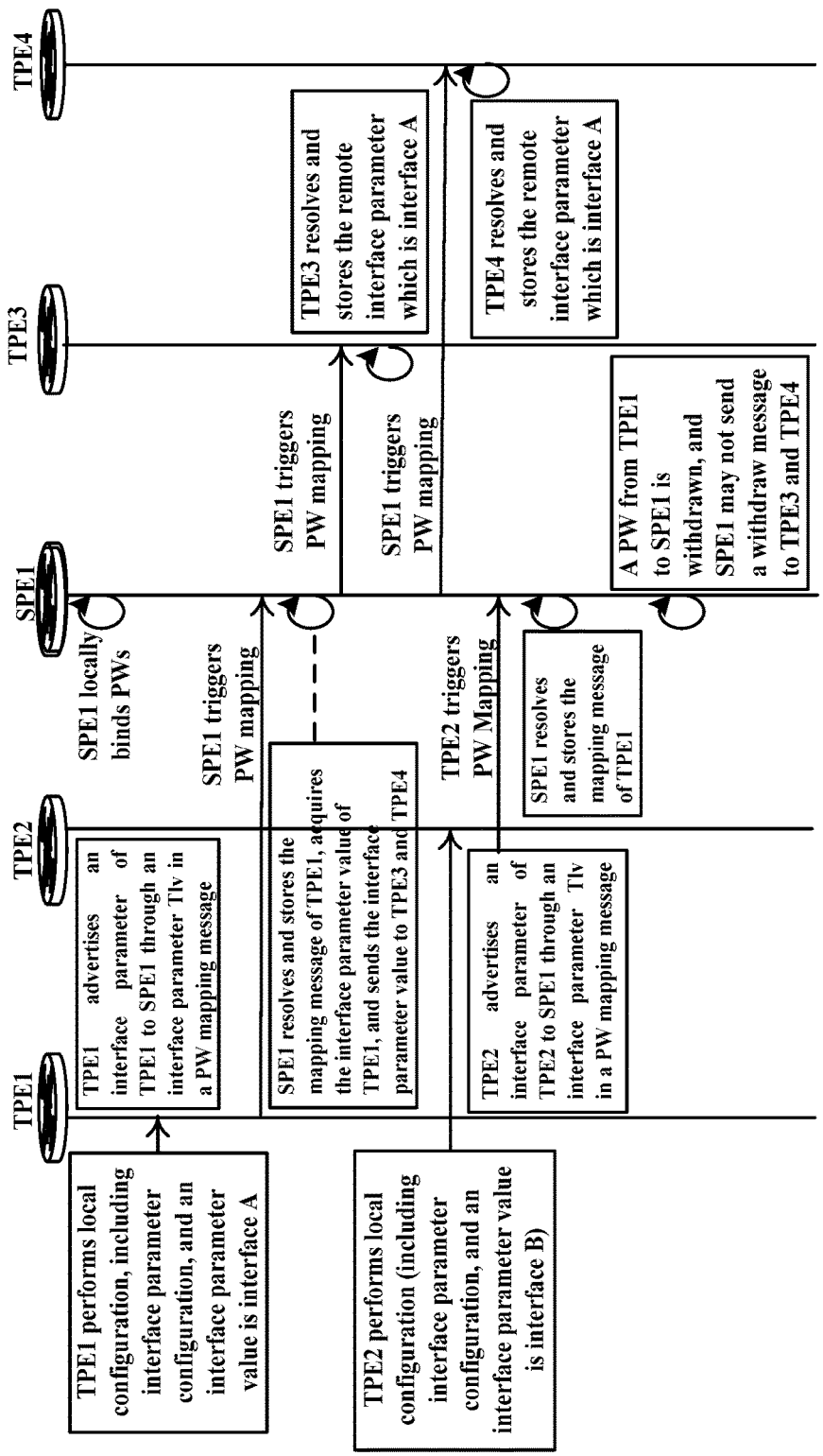
FIG. 4b is a diagram showing the signalling interaction in a dual-homing MSPW redundancy protection scenario when local configuration of a VCCV parameter is modified according to the related technology.
Figure 5:
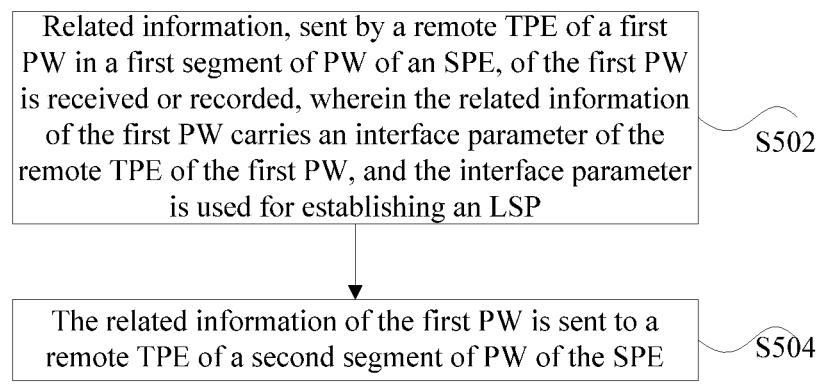
FIG. 5 is a flowchart of a method for synchronizing an interface parameter according to an embodiment of the present disclosure.

An embodiment provides a method for synchronizing an interface parameter. FIG. 5 is a flowchart of a method for synchronizing an interface parameter according to an embodiment of the present disclosure, and as shown in FIG. 5, the flow includes the following steps:

Step S502: related information, sent by a remote TPE of a first PW in a first segment of PW of an SPE, of the first PW is received or recorded, wherein the related information of the first PW carries an interface parameter of the remote TPE of the first PW, and the interface parameter is used for establishing an LSP; and Step S504: the related information of the first PW is sent to a remote TPE of a second segment of PW of the SPE.

By the steps, under a condition that the SPE establishes the LSP, the related information of the first PW is sent to the remote TPE of the second segment of PW (for example, through PWE3 signalling), thereby enabling the remote TPE of the second segment of PW to perceive the interface parameter of the remote TPE of the first PW. Compared with a solution in the related technology, when being applied to the condition that the remote TPE of the first PW is local equipment and the remote TPE of the second segment of PW is opposite equipment, the embodiment has the advantage that a problem caused by incapability of the opposite equipment in timely perceiving updating of the interface parameter of the local equipment is solved, thereby enabling the opposite equipment to use a correct interface parameter for negotiation and PW establishment.

In an example embodiment, under a condition of withdrawal of a single segment of PW of the first PW which has established the LSP, the method may further include that: related information, sent by a remote TPE of a second PW in the first segment of PW of the SPE, of the second PW is received and recorded, wherein the related information of the second PW carries an interface parameter of the remote TPE of the second PW, and the interface parameter is used for establishing an LSP; and a signalling withdraw message is sent to the remote TPE of the second segment of PW, wherein the signalling withdraw message is used for indicating the remote TPE of the second segment of PW to remove an interface parameter received by the remote TPE of the second segment of PW. In an example embodiment, the first segment of PW includes the first PW and the second PW the two of which form a protection group. In an example embodiment, the second segment of PW includes one or more PWs forming a protection group, which correspond to one or more remote TPEs respectively.

After the interface parameter of the remote TPE of the second segment of PW is removed, the remote TPE should receive an interface parameter sent by the SPE or receive an interface parameter actively configured by a user for parameter configuration. In an example embodiment, under a condition that the interface parameter of the local end and the interface parameter of the opposite end do not change, that is, when the interface parameters are initially configured to be consistent, the signalling withdraw message may not be sent to the TPE of the opposite end to reduce signalling resource and system overhead. For example, before the signalling withdraw message is sent to the remote TPE of the second segment of PW, whether the interface parameter of the remote TPE of the first PW carried in the recorded related information is consistent with the interface parameter of the remote TPE of the second PW carried in the recorded related information may be judged, wherein the signalling withdraw message is sent to the remote TPE of the second segment of PW when it is judged that the interface parameter of the remote TPE of the first PW is inconsistent with the interface parameter of the remote TPE of the second PW.

In an example embodiment, after the step that the signalling withdraw message is sent to the remote TPE of the second segment of PW, the related information of the second PW may be further sent to the remote TPE of the second segment of PW, thereby transmitting the interface parameter of the second PW to the one or more remote TPEs of the second segment of PW to configure the corresponding TPEs.

In an example embodiment, before the related information of the first PW is recorded, the first PW may also be determined from multiple PWs of the protection group of the first segment of PW according to a preset strategy.

In an example embodiment, the preset strategy may include that: under a condition that the related information of the PWs in the first segment of PW is received before local configuration, one PW in the first segment of PW is determined as the first PW in configuration; or under a condition that the related information of the PWs in the first segment of PW is received after local configuration, the PW, of which related information is received first, in the PWs in the first segment of PW is determined as the first PW. For example, under a condition that unique identification information of the PWs is not configured in a local configuration of the SPE, one PW in the first segment of PW is determined as the first PW according to a preset configuration; and under a condition that the unique identification information of the PWs has been configured in the local configuration of the SPE, the PW, of which related information is received first, in the first segment of PW is determined as the first PW. In this embodiment, each PW has unique identification information, the unique identification information is defined by a Request For Comments (RFC), and a content included in the unique identification information is also defined by the RFC. If the unique identification information of the PWs has been configured in the local configuration of the SPE, it represents that the local configuration about the PW has existed in the SPE; and if the unique identification information of the PW has not been configured in the local configuration of the SPE, it represents that the local configuration about the PW has not existed in the SPE.

In an example embodiment, the related information may further carry at least one of following parameters of the corresponding PW: a next-hop address, a PW ID, a PW type and an FEC type.

Another embodiment provides a device for synchronizing an interface parameter, the device is configured to implement the abovementioned method for synchronizing an interface parameter, and a specific implementation process of the device described in the device embodiment has been described in the method embodiment in detail, and will not be elaborated herein.

Figure 6:
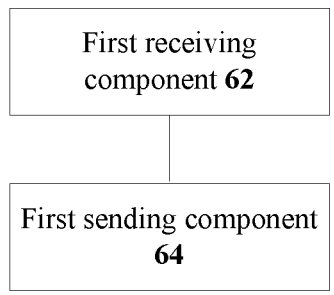
FIG. 6 is a structure diagram of a device for synchronizing an interface parameter according to an embodiment of the present disclosure.

FIG. 6 is a structure diagram of a device for synchronizing an interface parameter according to an embodiment of the present disclosure. As shown in FIG. 6, the device includes: a first receiving component 62 and a first sending component 64, wherein the first receiving component 62 is configured to receive and record related information, sent by a remote TPE of a first PW in a first segment of PW of an SPE, of the first PW, wherein the related information of the first PW carries an interface parameter of the remote TPE of the first PW, and the interface parameter is used for establishing an LSP; and the first sending component 64 is coupled to the first receiving component 62, and is configured to send the related information of the first PW to a remote TPE of a second segment of PW of the SPE.

The components and units involved in the embodiment of the present disclosure may be implemented in a form of software, and may alternatively be implemented in a form of hardware. The components and units described in the embodiment may also be set in a processor, for example, it may be described as follows: a processor includes a first receiving component 62 and a first sending component 64. It should be noted that the names of these components do not form limits to the components under a certain circumstance, for example, the first receiving component may also be described as "a component configured to receive and record related information, sent by a remote TPE of a first PW in a first segment of PW of an SPE, of the first PW".

Moreover, "first", "second" and the like in "first receiving component" and "second receiving component" in the embodiment are only adopted to identify and distinguish the corresponding components. Moreover, for example, "first receiving component" and "second receiving component" may refer to two components; and due to similarity or relevance in function, it is not limited that two separate components must be set, and for example, the two components may also be combined into one component.

Figure 7:
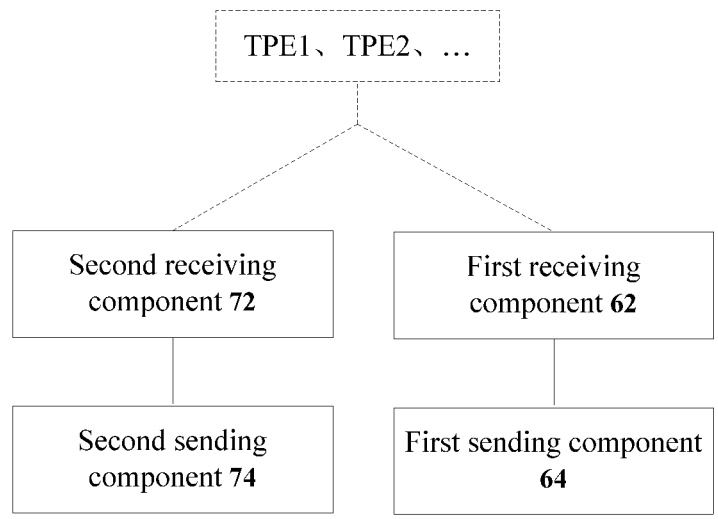
FIG. 7 is a first example structure diagram of a device for synchronizing an interface parameter according to an embodiment of the present disclosure.

FIG. 7 is a first example structure diagram of a device for synchronizing an interface parameter according to an embodiment of the present disclosure. As shown in FIG. 7, as an example embodiment, the device may further includes: a second receiving component 72, configured to receive and record related information, sent by a remote TPE of a second PW in the first segment of PW of the SPE, of the second PW, wherein the related information of the second PW carries an interface parameter of the remote TPE of the second PW, and the interface parameter is used for establishing an LSP; and a second sending component 74, coupled to the second receiving component 72 and configured to send a signalling withdraw message to the remote TPE of the second segment of PW, wherein the signalling withdraw message may be used for indicating the remote TPE of the second segment of PW to remove an interface parameter received by the remote TPE of the second segment of PW.

Figure 8:
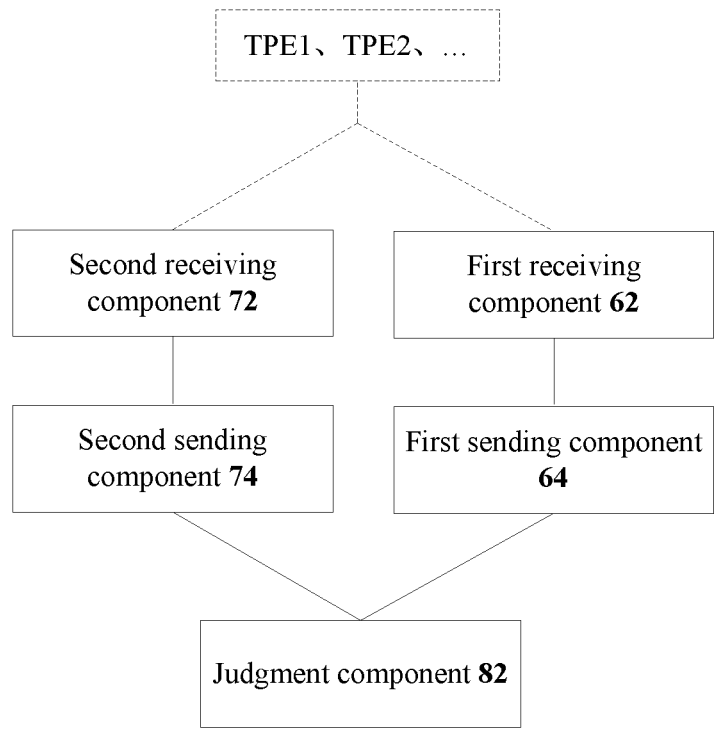
FIG. 8 is a second example structure diagram of a device for synchronizing an interface parameter according to an embodiment of the present disclosure.

FIG. 8 is a second example structure diagram of a device for synchronizing an interface parameter according to an embodiment of the present disclosure. As shown in FIG. 8, as an example embodiment, the device may further include: a judgment component 82, coupled to the first sending component 64 and the second sending component 74 and configured to judge whether the interface parameter of the remote TPE of the first PW carried in the recorded related information is consistent with the interface parameter of the remote TPE of the second PW carried in the recorded related information, wherein the second sending component 74 sends the signalling withdraw message to the remote TPE of the second segment of PW under a condition that the judgment component 82 judges that the interface parameter of the remote TPE of the first PW is inconsistent with the interface parameter of the remote TPE of the second PW.

Figure 9:
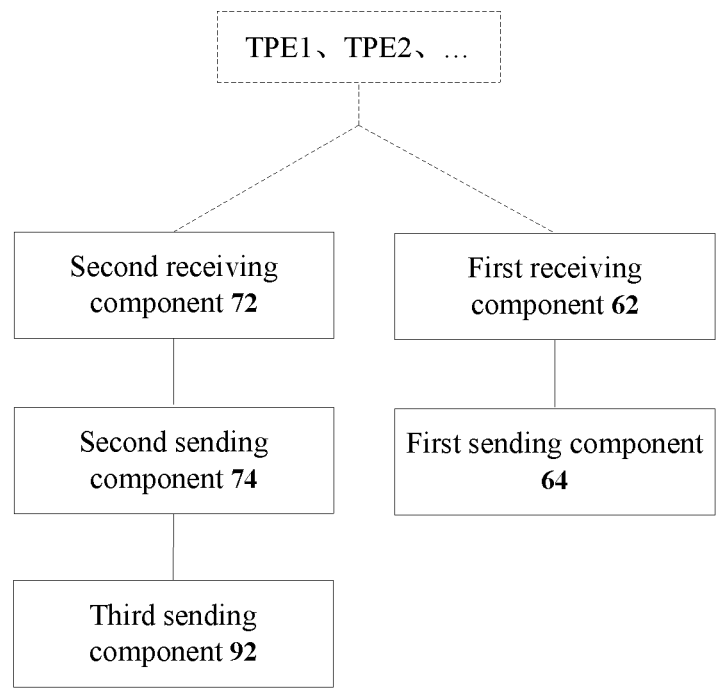
FIG. 9 is a third example structure diagram of a device for synchronizing an interface parameter according to an embodiment of the present disclosure.

FIG. 9 is a third example structure diagram of a device for synchronizing an interface parameter according to an embodiment of the present disclosure. As shown in FIG. 9, as an example embodiment, the device may further include: a third sending component 92, coupled to the second sending component 74 and configured to send the related information of the second PW to the remote TPE of the second segment of PW.

Figure 10:
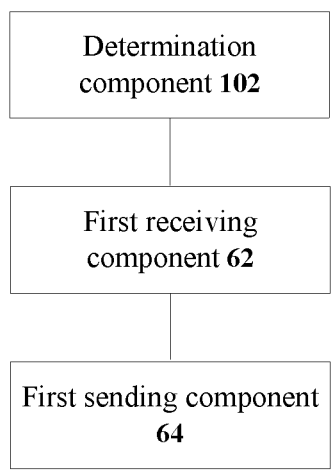
FIG. 10 is a fourth example structure diagram of a device for synchronizing an interface parameter according to an embodiment of the present disclosure.

FIG. 10 is a fourth example structure diagram of a device for synchronizing an interface parameter according to an embodiment of the present disclosure. As shown in FIG. 10, as an example embodiment, the device may further include: a determination component 102, coupled to the first receiving component 62 and configured to determine the first PW according to a preset strategy.

In an example embodiment, the preset strategy may include that: under a condition that the related information of PWs in the first segment of PW is received before local configuration, one PW in the first segment of PW is determined as the first PW in configuration; or under a condition that the related information of the PWs in the first segment of PW is received after local configuration, the PW, of which related information is received first, in the PWs in the first segment of PW is determined as the first PW. For example, under a condition that unique identification information of the PWs is not configured in a local configuration of the SPE, one PW in the first segment of PW is determined as the first PW according to a preset configuration; and under a condition that the unique identification information of the PWs has been configured in the local configuration of the SPE, the PW, of which related information is received first, in the first segment of PW is determined as the first PW.

In an example embodiment, the related information may further carry at least one of following parameters of the corresponding PW: a next-hop address, a PW ID, a PW type and an FEC type.

Description and introduction will be made below with reference to an example embodiment.

The example embodiment provides a processing mechanism of an SPE for previous-hop FEC information in a condition of MSPW redundancy, and relates to a processing mechanism for the condition that interface parameters in previous-hop FEC information, received by the SPE, of master and standby PWs in a redundant networking environment of the SPE in a scenario of MSPW redundancy are inconsistent.

The processing mechanism provided by the example embodiment includes the following steps:

Step 1: the SPE locally binds PWs;

Step 2: remote TPEs of redundant master and standby PWs of the SPE perform PW interface parameter configuration;

Step 3: the TPEs advertise locally configured PW interface parameters to the SPE through PWE3 signalling respectively;

Step 4: the SPE resolves the PWE3 signalling advertised by the remote TPEs of the master and standby PWs, selects a certain PW according to a local selection strategy, and records related information of the PW;

Step 5: the SPE advertises the interface parameter of the recorded PW to a remote TPE of another segment of master and standby PWs through a PWE3 signalling message;

Step 6: under a condition of withdrawal of a single segment of PW of the PW recorded by the SPE for a certain reason, the SPE locally records related information of the other PW, which is configured to protect the PW, in the protection group;

Step 7: after Step 6 is executed, the SPE sends a PWE3 signalling withdraw message to the remote TPE of the master and standby PWs of the above-mentioned another segment of PW according to a local strategy 2; and Step 8: after Step 7 is executed, Step 5 to Step 7 are repeated until interface parameters of each remote TPE are consistent.

In the example embodiment, the PW interface parameter in Step 2 may include an interface Maximum Transmission Unit (MTU), Maximum Number of concatenated ATM cells, Circuit Emulation over Packet (CEP)/Time Division Multiplexing (TDM) Payload Bytes, CEP options, Requested Virtual Local Area Network Identifier (Requested VLAN ID), CEP/TDM bit-rate, Frame-Relay Data Link Connection Identifier Length (FR DLCI Length), Fragmentation indicator, Frame Check Sequence retention indicator (FCS retention indicator), TDM options and VCCV parameter described in RFC4446 (Internet Assigned Numbers Authority (IANA) Allocations for PWE3 standard of the Internet Engineering Task Force (IETF)).

In the example embodiment, the related information of the PW recorded by the SPE in Step 4 may include at least one of: a next-hop address, a PW ID, a PW type and an FEC type.

In the example embodiment, the local selection strategy 1 in Step 4 may include that: under a condition that the SPE receives mapping messages of the master and standby PWs before local configuration, a master PW in the master and standby PWs is preferably selected; and under a condition that the SPE receives the mapping messages of the master and standby PWs after local configuration, the PW, of which a mapping message is received first, in the master and standby PWs is preferably selected.

In the example embodiment, the reason mentioned in Step 6 may include: LDP session shock, Graceful Restart (GR) overtime and configuration deletion.

In the example embodiment, the local strategy 2 in Step 7 may include that: the remote interface parameter of the PW locally recorded by the SPE is inconsistent with the interface parameter in the mapping message sent by the other segment of master and standby PWs of the SPE.

By the processing mechanism for the condition that the interface parameters in the previous-hop FEC information, received by the SPE, of the master and standby PWs are inconsistent in the example embodiment, the opposite equipment may timely perceive an updating change of the interface parameter of the local equipment, and the latest interface parameter is sent to the opposite equipment through PWE3 signalling, thereby ensuring that the opposite equipment can use a correct interface parameter value for negotiation and PW establishment.

The example embodiment will be described below with reference to the drawings.

Figure 11:
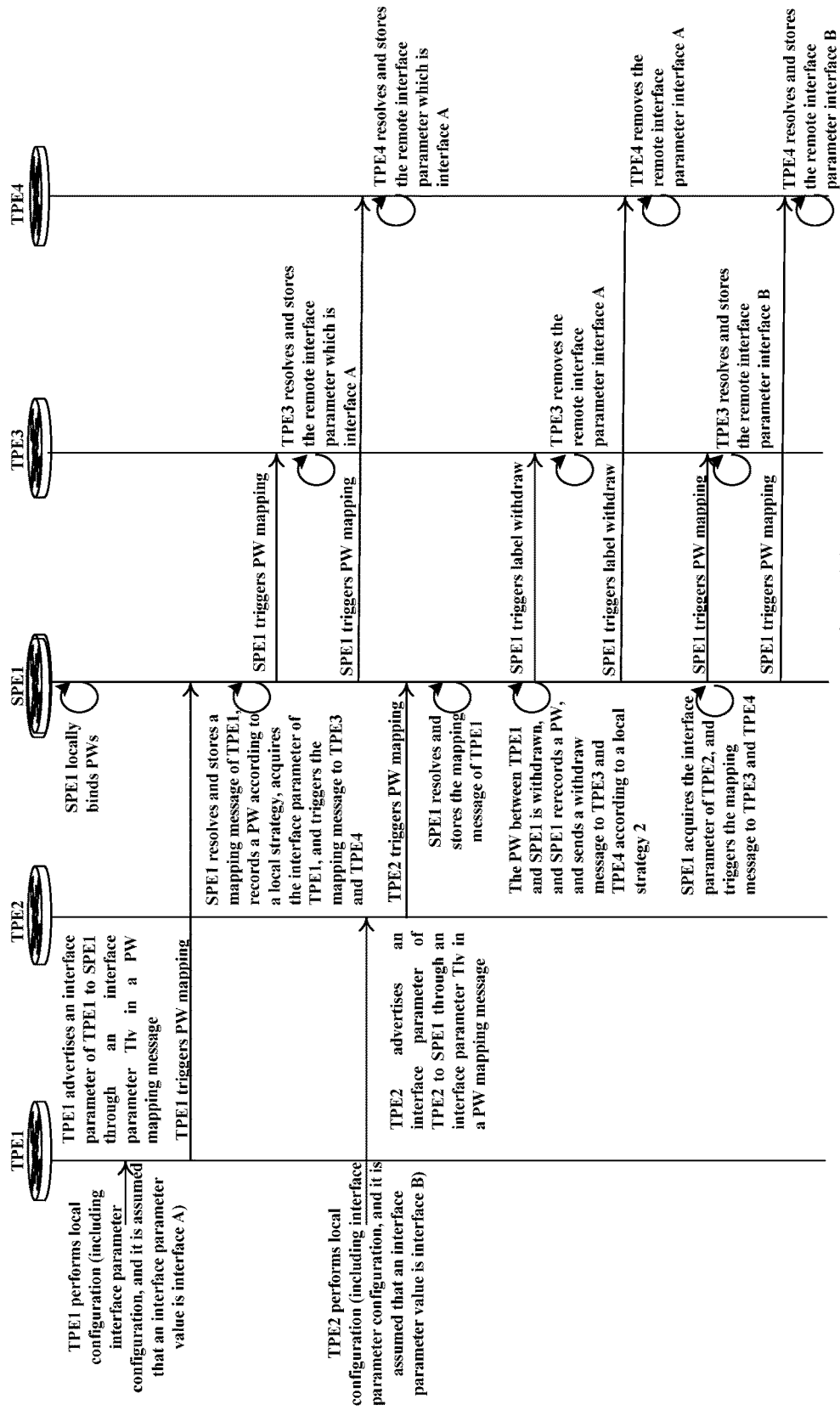
FIG. 11 is a diagram showing the signalling interaction of a processing mechanism in case of inconsistent interface parameters according to an example embodiment of the present disclosure.

FIG. 11 is a diagram showing the signalling interaction of a processing mechanism in case of inconsistent interface parameters according to an example embodiment of the present disclosure. As shown in FIG. 11, TPE1 performs PW related parameter configuration at first, including local PW interface parameter configuration. After TPE1 finishes configuration, TPE1 initiates PWE3 signalling, and advertises PW related information (including an interface parameter) on TPE1 to SPE1 through a PW mapping message. SPE1 receives the mapping message from TPE1, and resolves and stores the PW related information (including the interface parameter) of TPE1, and SPE1 simultaneously records a PW between TPE1 and SPE1 according to a local strategy 1, acquires a remote interface parameter of the PW, i.e. an interface parameter of TPE1, constructs a PW mapping message, and sends the PW mapping message to TPE3 and TPE4. TPE3 and TPE4 receive the PW mapping message sent by SPE1, and resolve and store the related information including the interface parameter. Then, TPE2 performs PW related parameter configuration, TPE2 initiates PWE3 signalling to SPE1, and advertises PW related information, including an interface parameter, on TPE2 to SPE1 through a PW mapping message, and SPE1 receives the PW mapping message of TPE2, and resolves and stores the PW related information, including the interface parameter, on TPE2. In case of PW withdrawal of the PW recorded by SPE1, i.e. the PW between TPE1 and SPE1, SPE1 rerecords a PW between TPE2 and SPE1, and triggers a label withdraw message (equivalent to the abovementioned signalling withdraw message) to TPE3 and TPE4 according to a local strategy 2, and TPE3 and TPE4 locally remove the stored remote interface parameter after receiving the label withdraw message. Then, SPE1 acquires a remote interface parameter of the recorded PW, i.e. an interface parameter of TPE2, constructs a PW mapping message and sends the PW mapping message to TPE3 and TPE4, and TPE3 and TPE4 receive the PW mapping message sent by SPE1, and resolve and store the related information including the interface parameter.

From the above, the processing mechanism for the condition that the interface parameters in the previous-hop FEC information are inconsistent when the previous-hop FEC information of the master and standby PWs is received by the SPE is provided in the abovementioned embodiments or example embodiments of the present disclosure. When the PW interface parameters on TPE1 and TPE2 are inconsistent, the SPE can ensure that TPE3 and TPE4 timely update the remote interface parameter and use the timely updated interface parameter value for negotiation and PW establishment through the processing mechanism.

INDUSTRIAL APPLICABILITY

According to the embodiments of the present disclosure, the related information, sent by the remote TPE of the first PW in the first segment of PW of the SPE, of the first PW is received and recorded, wherein the related information of the first PW carries the interface parameter of the remote TPE of the first PW, and the interface parameter is used for establishing the LSP; and the related information of the first PW is sent to the remote TPE of the second segment of PW of the SPE, so that a problem caused by incapability of opposite equipment in timely perceiving updating of an interface parameter of local equipment is solved, and the opposite equipment can use a correct interface parameter value for negotiation and PW establishment.

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, or may form each integrated circuit component respectively, or multiple components or steps therein can form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

What is claimed is:

1. A method for synchronizing an interface parameter, comprising:
   receiving and recording related information, sent by a remote Terminating Provider Edge (TPE) of a first Pseudo-Wire (PW) in a first PW segment of a Switching Provider Edge (SPE), of the first PW, wherein the related information of the first PW carries an interface parameter of the remote TPE of the first PW, and the interface parameter is used for establishing a Label Switch Path (LSP); and
   sending the related information of the first PW to a remote TPE of a second PW segment of the SPE;
   receiving and recording related information, sent by a remote TPE of a second PW in the first PW segment of the SPE, of the second PW, wherein the related information of the second PW carries an interface parameter of the remote TPE of the second PW, and the interface parameter is used for establishing an LSP;
   sending a signalling withdraw message to the remote TPE of the second PW segment, wherein the signalling withdraw message is used for indicating the remote TPE of the second PW segment to remove an interface parameter received by the remote TPE of the second PW segment;
   sending the related information of the second PW to the remote TPE of the second PW segment of the SPE;
   wherein before sending the signalling withdraw message to the remote TPE of the second PW segment, the method further comprises:
   judging whether the interface parameter of the remote TPE of the first PW carried in the recorded related information is consistent with the interface parameter of the remote TPE of the second PW carried in the recorded related information, wherein the signalling withdraw message is sent to the remote TPE of the second PW segment when it is judged that the interface parameter of the remote TPE of the first PW is inconsistent with the interface parameter of the remote TPE of the second PW.

2. The method as claimed in claim 1, after sending the signalling withdraw message to the remote TPE of the second PW segment, the method further comprising:
   sending the related information of the second PW to the remote TPE of the second PW segment.

3. The method as claimed in claim 1, before the related information of the first PW is recorded, the method further comprising:
   determining the first PW according to a preset strategy.

4. The method as claimed in claim 3, wherein the preset strategy comprises one of:
   determining one PW in the first PW segment as the first PW according to a preset configuration under a condition that unique identification information of PWs is not configured in a local configuration of the SPE; and
   determining the PW, of which related information is received first, in the PWs in the first PW segment as the first PW under a condition that the unique identification information of the PWs has been configured in the local configuration of the SPE.

5. The method as claimed in claim 1, wherein the related information further carries at least one of following parameters of the corresponding PW:

a next-hop address, a PW identifier (ID), a PW type and a Forwarding Equivalence Class (FEC) type.

6. The method as claimed in claim 2, wherein the related information further carries at least one of following parameters of the corresponding PW:
a next-hop address, a PW identifier (ID), a PW type and a Forwarding Equivalence Class (FEC) type.

7. The method as claimed in claim 3, wherein the related information further carries at least one of following parameters of the corresponding PW:
a next-hop address, a PW identifier (ID), a PW type and a Forwarding Equivalence Class (FEC) type.

8. The method as claimed in claim 4, wherein the related information further carries at least one of following parameters of the corresponding PW:
a next-hop address, a PW identifier (ID), a PW type and a Forwarding Equivalence Class (FEC) type.

9. A device for synchronizing an interface parameter, comprising a hardware processor and a memory, and the hardware processor is configured to execute program components stored on the memory, the program components comprising:
a first receiving component, configured to receive and record related information, sent by a remote Terminating Provider Edge (TPE) of a first Pseudo-Wire (PW) in a first PW segment of a Switching Provider Edge (SPE), of the first PW, wherein the related information of the first PW carries an interface parameter of the remote TPE of the first PW, and the interface parameter is used for establishing a Label Switch Path (LSP); and a first sending component, configured to send the related information of the first PW to a remote TPE of a second PW segment of the SPE;
a second receiving component, configured to receive and record related information, sent by a remote TPE of a second PW in the first PW segment of the SPE, of the second PW, wherein the related information of the second PW carries an interface parameter of the remote TPE of the second PW, and the interface parameter is used for establishing an LSP;
a second sending component, configured to send a signalling withdraw message to the remote TPE of the second PW segment, wherein the signalling withdraw message is used for indicating the remote TPE of the second PW segment to remove an interface parameter received by the remote TPE of the second PW segment;
a third sending component configured to send the related information of the second PW to the remote TPE of the second PW segment of the SPE;
a judgment component, configured to judge whether the interface parameter of the remote TPE of the first PW carried in the recorded related information is consistent with the interface parameter of the remote TPE of the second PW carried in the recorded related information; wherein the second sending component is configured to send the signalling withdraw message to the remote TPE of the second PW segment under a condition that the judgment component judges that the interface parameter of the remote TPE of the first PW is inconsistent with the interface parameter of the remote TPE of the second PW.

* * * * *